Dec. 1, 1964 W. J. BIERMANN 3,159,453
BERYLLIUM OXIDE EXTRACTION PROCESS
Filed April 19, 1961

Inventor
WENDELL J. BIERMANN

United States Patent Office 3,159,453
Patented Dec. 1, 1964

3,159,453
BERYLLIUM OXIDE EXTRACTION PROCESS
Wendell J. Biermann, Winnipeg, Manitoba, Canada, assignor, by mesne assignments, to Beryloy Limited (No Personal Liability), Winnipeg, Manitoba, Canada
Filed Apr. 19, 1961, Ser. No. 104,176
7 Claims. (Cl. 23—18)

This invention relates to improvements in the chemical metallurgy of beryllium and more particularly to an improved process of extracting beryllium oxide from beryllium containing ores.

In conventional processes for the preparation of beryllium compounds from beryllium containing ore, the ore, which almost invariably contains aluminum and iron and usually other metallic elements, and which, in the state in which it naturally occurs, is very difficult to chemically attack, is fused, as for example, in an arc furnace, with or without a flux, giving a mixture of oxides. This oxide mixture is then in a state which is more susceptible to chemical attack and is conventionally taken into solution with sulphuric acid. Unfortunately, the beryllium oxide which it is desired to recover dissolves more slowly than the oxides of the aluminum, iron and other accompanying metallic constituents so that present processes involve the complete solution of all the metallic constituents, which in solution form can be more readily separated, it being understood that the sulphuric acid step does not in itself effect any separation of the metal constituents. In the actual separation procedures the unwanted oxides must then be removed by the use of a succession of reagents until only beryllium compounds remain in solution, at which point beryllium is precipitated out as an hydroxide.

In carrying out the extraction of the beryllium compounds according to the present methods, it will be understood that sufficient sulphuric acid to dissolve all of the metallic elements present in the ore is required. Further, as the various metallic elements are extracted from the solution to reduce the solution to one containing the wanted beryllium compound, the requisite reagents to effect the extraction of the unwanted compounds are required. Moreover, all of the metallic compounds separated out contain at least a trace of beryllium compounds which are extremely toxic and not only are the extracted metallic compounds unusable as not having sufficient commercial merit to warrant the expense of rendering them innocuous, but they must additionally be disposed of with the utmost of care.

Thus, present processes for extracting beryllium compounds from beryllium containing ores are complex and time-consuming, requiring substantial quantities of expensive reagents in a series of separate procedures with the reagents and the compounds extracted thereby all becoming highly dangerous waste substance involving costly disposal.

It is the object of the present invention to greatly simplify the process and reduce the cost of extraction of beryllium compounds and more particularly beryllium oxide from beryllium containing ore.

More particularly, it is the object of the invention to substantially reduce the separate extraction steps and the need for a large number of different reagents presently required in carrying out the extraction of the wanted beryllium compound.

Still another important object is to greatly reduce the quantity of the highly toxic waste substances produced in the extraction process rendering the extraction process safer and materially reducing waste disposal problems.

The invention evolves from the discovery that beryllium oxide may be extracted directly from the beryllium containing ores such as beryl, which have been conventionally treated, as by fusion, to reduce the beryllium and other metallic elements to the oxide form, by means of soluble beryllium salts leaving behind the remaining groups of metallic oxides as waste.

Of the soluble beryllium salts which may be used, beryllium sulphate has been found to be particularly efficacious although other soluble beryllium salts such as beryllium nitrate, beryllium, perchlorate, beryllium chloride and beryllium acetate may also be used.

This discovery has enabled an almost complete separation of the contained beryllium in a single step with a single reagent and the bulk of unwanted metallic constituents may be disposed of as a single toxic waste substance without requiring any additional steps of separation or additional reagents.

Such a single step extraction has previously not been considered feasible since in all previous approaches it has been found impossible to separate the beryllium oxide from, in particular, the aluminum oxide which is chemically very similar to the beryllium oxide and invariably has been taken into solution with the beryllium oxide in the reagent used to dissolve the beryllium oxide. I have found, however, that at moderate temperatures beryllium oxide is readily soluble, for example, in a strong solution of beryllium sulphate, while aluminum oxide, and of course the other more dis-similar metallic oxides, are only slightly soluble in beryllium sulphate under the same conditions.

More particularly, I have found that for optimum separation, the beryllium and other metallic oxide mixture may be treated with a highly concentrated solution of beryllium sulphate at a temperature of approximately 180° C. for approximately six hours.

These and other objects and features will become apparent from the following detailed description taken in conjunction with the accompanying drawings in which.

Figure 1:
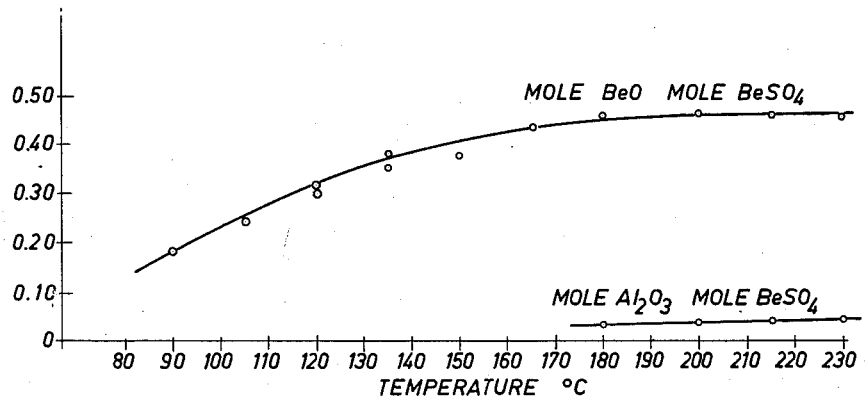
FIGURE 1 is a graph illustrating the effect of temperature on the number of moles of beryllium oxide and on the number of moles of aluminum oxide dissolved per mole of beryllium sulphate in a six hour period, in a beryllium sulphate solution saturated at 25° C.

As explained above, the treatment of beryllium containing ores has previously involved a series of separate steps requiring a number of different reagents producing toxic by-products which normally do not warrant further treatment but must be carefully discarded. The number of steps and different reagents required, of course, will depend on the constitution of the beryllium containing ore being treated. Such beryllium containing ore almost always contains aluminum and frequently iron as well, but it may contain any number of other metals. One of the frequently found beryllium containing ores is a double silicate of aluminum and beryllium known as beryl, and because of the close chemical similarity between aluminum and beryllium, the extraction of beryllium or beryllium compounds is very difficult.

In the "as found" form, the ore itself is very difficult to attack as the beryllium compounds in particular have a very low solubility and while beryllium containing ores such as beryl may be attacked by hydrofluoric acid, the use of such an acid would be prohibitively expensive for a commercial extraction process.

It has been found, however, that the beryllium containing ore, such as beryl, may be reduced by heat treating to a mixture of oxides containing, for example, in the case of beryl, beryllium and aluminum oxides, although of course other oxides may be present, and in this form the mixture is susceptible to chemical attack. As stated, at this stage in the extraction of the desired beryllium compound or beryllium, sulphuric acid is normally used to dissolve the beryllium oxide, but the sulphuric acid will also dissolve the other oxides present so that the treatment with the sulphuric acid does not effect any separation of the beryllium compounds but merely takes them into a form so that separation of the unwanted metals can be effected step by step by the selection of the appropriate reagents to ultimately leave the berylium compound.

This step-by-step separation has been necessary since any reagents previously proposed for precipitating the beryllium would also precipitate one or more of the other metals present in the mixture and each of these other metals must be removed separately with an appropriate reagent to finally leave the beryllium which can then be recovered as oxide.

In the efforts to separate the other metallic oxides present with beryllium oxide, in the ore which has been reduced to an oxide mixture, particular difficulty is experienced with the aluminum oxide because of the great chemical similarity between beryllium oxide and aluminum oxide.

I have discovered, however, that selective leaching of beryllium oxide from an oxide mixture can be effected by subjecting the beryllium and aluminum or other metallic oxide mixture to a solution of a soluble beryllium salt. This selective leaching is possible since I have found that beryllium oxide is relatively readily soluble in a solution of a soluble beryllium salt, particularly a concentrated solution, while other metallic oxides, and in particular the aluminum oxide which is chemically so similar to beryllium oxide, have very limited solubility in such a solution.

While a number of soluble beryllium salts may be used, such as beryllium nitrate, beryllium perchlorate, beryllium chloride, and beryllium acetate, a particularly advantageous solvent is beryllium sulphate.

It would appear that the solution of the soluble beryllium salt such as beryllium sulphate combines with the beryllium oxide to form a polynuclear species of beryllium compound having an empirical formula $$2BeSO_4 \cdot BeO$$

which goes into solution and is highly stable.

It would also appear that the limited solubility of, for example, aluminum oxide, is most likely due to its having a basicity similar to that of beryllium oxide and simply displacing some of the aquoberyllium ions from solution, the displaced beryllium ions then entering into the polynuclear form of beryllium compound. In this connection, experiments have established that highly diluting the solutions in which the beryllium oxide had dissolved, as by washing onto a filter, showed no tendency to reprecipitate the dissolved beryllium oxide even when allowed to stand for several months at room temperature.

In investigating the optimum conditions for separation of beryllium oxide from other metallic oxides, and in particular, aluminum oxide, it has been found that the rate of solution of the beryllium oxide is increased as the concentration of the beryllium salt solution is increased. For example, with reference to FIGURE 3, it will be seen from the curve 5 that the number of moles of beryllium oxide dissolved per mole of beryllium sulphate solution increased proportionally to the concentration of the berryllium sulphate solution with the optimum solubility occurring with a saturated solution. The test was carried out with the solution at 180° C. and with the dissolving time in each case six hours.

From the curve 1 of FIGURE 1 it will be seen that with the preferred beryllium sulphate solution saturated at 25° C., the number of moles of beryllium oxide taken into solution per mole of beryllium sulphate solution increased with temperature until maximum at approximately 180° C. was reached. In each case, the time allowed for the beryllium oxide to dissolve was six hours.

Figure 2:
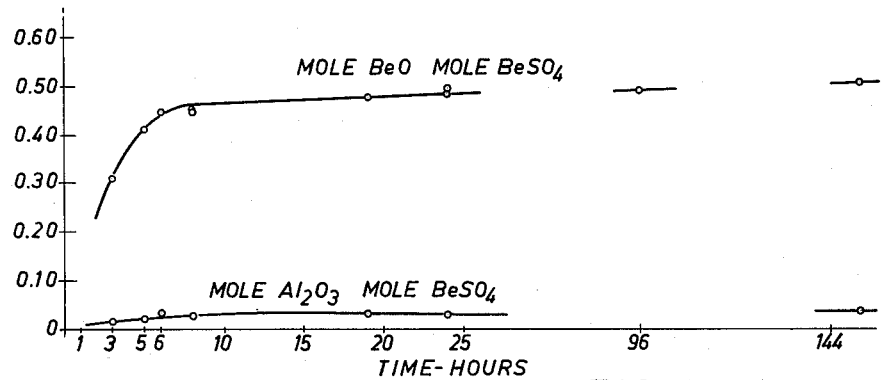
FIGURE 2 is a graph showing the effect of time on the number of moles of beryllium oxide and on the number of moles of aluminum oxide dissolved per mole of beryllium sulphate, saturated at 25° C., at a temperature of 180° C.

Curve 2 of FIGURE 2 shows that six hours was the optimum time for achieving optimum solution of the beryllium oxide in the beryllium sulphate solution with the sulphate solution being saturated at 25° C. and maintained in each case at 180° C. during the dissolving steps.

In FIGURE 1, curve 1 shows the number of moles of beryllium oxide dissolved per mole of beryllium sulphate, whereas curve 3 indicates the relationship between the number of moles of aluminum oxide dissolved per mole of beryllium sulphate under the same conditions. It will be seen that the aquoberyllium ion in solution has provided a very selective leaching action dissolving substantially greater berylium oxide. This beryllium oxide is believed to be taken into solution as a polynuclear beryllium compound and this compound is highly stable and will not precipitate out when working out the undissolved aluminum and other metallic oxides.

From FIGURE 2 a comparison of the curve 2, which is the number of moles of beryllium oxide dissolved per mole of beryllium sulphate, and curve 4, which shows the number of moles of aluminum oxide dissolved per mole of beryllium sulphate under identical conditions, it will be seen that a much greater quantity of beryllium oxide is taken into solution by the beryllium sulphate solution than aluminum oxide.

Figure 3:
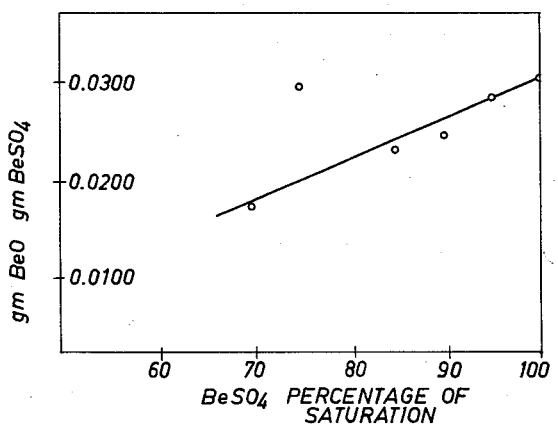
FIGURE 3 is a graph showing the effect of concentration of beryllium sulphate solution on the number of moles of beryllium oxide which will dissolve per mole of beryllium sulphate at 180° C. in six hours.

From FIGURES 1, 2 and 3, it will therefore be seen that for optimum conditions for dissolving beryllium oxide in beryllium sulphate solutions, the beryllium sulphate solution should have a high concentration, e.g., saturated at 25° C. and the temperature is preferably maintained at 180° C. and the time for solution is limited to six hours. It will be obvious from the curves of FIGURES 1 to 3, however, that even if these optimum conditions of temperature, time and solution concentration are not met, nevertheless there is still a very selective leaching effect by the beryllium sulphate solution over a very considerable range of temperatures, times, and solution concentrations.

In the actual treatment of the beryllium containing ore, for example, beryl, the ore is decomposed into a mixture of oxides by some conventional method which may constitute fusion in an arc furnace followed by steam quenching of the melt to reduce the ore to an oxide mixture comprising, at least, in the case of beryl, a mixture of the oxides of aluminum and beryllium.

This oxide mixture is then preferably finely ground and leached in an autoclave with a saturated solution of beryllium sulphate at 180° C., the amount of beryllium sulphate required to produce the above defined polynuclear beryllium compound $2BeSO_4 \cdot BeO$ being readily calculable depending upon the quantity and constituency of the ore or beryl as will readily be understood.

The pregnant leach solution is then recovered by conventional washing, filtering or centrifuging with the solids left after extraction being discarded as a single toxic waste product.

Thus it will be seen that in the single step of separating out the beryllium from the bulk of the other metals, notably aluminum, allows the residue in the form of undissolved solids to be discraded without having to remove each metallic element by a separate reagent and minimizing the toxic waste simply to the solids discarded and without creating additional toxic waste through the contamination of reagents previously required to separate out each metallic constituent.

Thus, through the single step of separating out the beryllium oxide from the other metals, the present invention requires fewer chemicals, a greatly reduced number of steps and a very substantial saving in the toxic waste.

As will be seen from FIGURES 1 and 2, after the solids left after extraction have been discarded, there will also be a very small amount of aluminum oxide present in the solution which represents an impurity and for the recovery of the pure form of beryllium oxide a purification operation, such as sequestering the aluminum by Versene addition, is required.

A calculated amount of sulphuric acid is added to the leaching liquid to convert the beryllium in the leaching liquid to beryllium sulphate, part of which is then re-used for a new leaching cycle. Thus the process alternatively involves the production of beryllium sulphate.

The beryllium oxide may then be precipitated out of the remaining product, for example, by ammonia. The resulting beryllium oxide or alternatively the beryllium sulphate have many uses in themselves and may be considered end products of the process. However, it will be obvious that beryllium metal and other beryllium compounds may be derived from the beryllium oxide product of the present process.

While the process is particularly applicable to the ore beryl, it will be understood that the selective leaching step through the use of suitable soluble beryllium salts, and in particular beryllium sulphate solutions, may also be applied to other beryllium containing ores.

Further, while I have described the preferred temperatures, times, and solution concentrates, it will be understood that variations in the actual processing step details in carrying out beryllium oxide extraction processes may be made by those skilled in the art, and according to the ore and circumstances encountered, without departing from the spirit of the invention or the scope of the appended claims.

What I claim is:

1. The process of separating beryllium oxide from a mixture of metallic oxides including at least beryllium oxide and aluminum oxide, comprising introducing such mixture into a solution of a soluble beryllium salt selected from the group consisting of beryllium sulphate, beryllium nitrate, beryllium perchlorate, beryllium chloride and beryllium acetate to dissolve out the beryllium oxide while leaving the aluminum oxide substantially undissolved and then recovering the beryllium oxide from the solution.

2. The process as claimed in claim 1 in which said solution comprises a solution of beryllium sulphate.

3. The process as claimed in claim 2 in which said solution comprises a saturated solution of beryllium sulphate.

4. In the treatment of ore containing at least beryllium and aluminum, the steps of heating the ore to reduce same to a mixture of oxides comprising beryllium oxide and at least aluminum oxide, then subjecting such oxide mixture to a concentrated solution of beryllium sulphate to dissolve out the beryllium oxide while leaving the aluminum oxide substantially undissolved, and then recovering the beryllium oxide from solution.

5. A process as claimed in claim 4 in which said oxide mixture is subjected to said concentrated beryllium sulphate solution at a temperature of approximately 180° C.

6. A process as claimed in claim 5 in which said oxide mixture is subjected to said concentrated beryllium sulphate solution for at least approximately six hours.

7. A process for recovering beryllium oxide from ores containing at least beryllium and aluminum comprising reducing the ore by heat to a mixture of oxides including beryllium and aluminum oxide, then subjecting the mixture to a concentrated solution of beryllium sulphate at a temperature of approximately 180° C. to dissolve out the beryllium oxide while leaving the aluminum oxide substantially undissolved, then recovering the beryllium oxide from solution.

References Cited in the file of this patent

Winter, E. A.: "Production of Beryllium Oxide From Beryl," dissertation submitted to Faculty of Pure Science, Columbia Univ., New York, 1939, 38 pages (pages 8–16 of particular interest).

Mellor: A Comprehensive Treatesi on Inorganic and Theoretical Chemistry, vol. 4, Longmans, Green & Co., New York, 1923, pages 224–225.